United States Patent [19]

Eide et al.

[11] Patent Number: 4,725,879
[45] Date of Patent: Feb. 16, 1988

[54] CHROMA RESPONSIVE INSPECTION APPARATUS SELECTIVELY PRODUCING ANALOG VOLTAGE LEVELS BASED ON THE LUMINANCE, THE PHASE OF THE CHROMINANCE SUBCARRIER, OR THE AMPLITUDE OF THE CHROMINANCE SUBCARRIER

[75] Inventors: Donald A. Eide; Richard L. Swanson, both of Hennepin, Minn.; Aina B. Brown, Franklin, Ohio

[73] Assignee: Honeywell Inc., Minneapolis, Minn.

[21] Appl. No.: 30,796

[22] Filed: Mar. 27, 1987

[51] Int. Cl.⁴ .................................................. H04N 9/74
[52] U.S. Cl. ........................................ 358/22; 358/81; 358/160; 358/10; 358/106; 382/17
[58] Field of Search .................... 358/22, 81, 106, 160, 358/10, 21 R; 382/17

[56] References Cited

U.S. PATENT DOCUMENTS

| | | | |
|---|---|---|---|
| 2,920,130 | 1/1960 | Gibson et al. | 358/16 |
| 4,236,175 | 11/1980 | Groothuis | 358/30 |
| 4,481,529 | 11/1984 | Kerling | 358/30 |
| 4,547,897 | 10/1985 | Peterson | 358/22 |
| 4,590,511 | 5/1986 | Bocchi et al. | 358/10 |

Primary Examiner—John W. Shepperd
Attorney, Agent, or Firm—Roger W. Jensen

[57] ABSTRACT

An inspection apparatus is arranged to respond, selectively, at the option of the operator, to either the hue component of the composite color signal, the saturation component of the composite video signal or the intensity or luminance component of the composite signal, to produce a corresponding output signal to which the signal image processor may respond to produce suitable gray-scale images for the operation of the inspection system.

8 Claims, 5 Drawing Figures

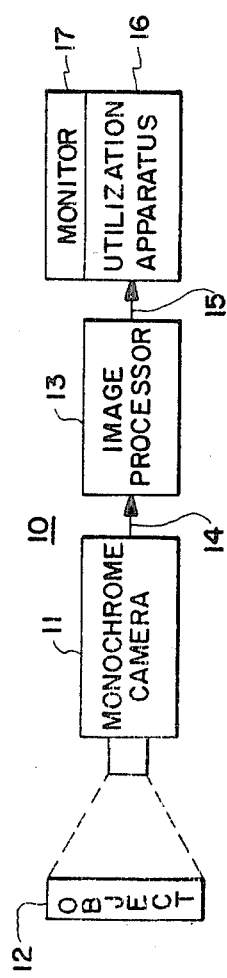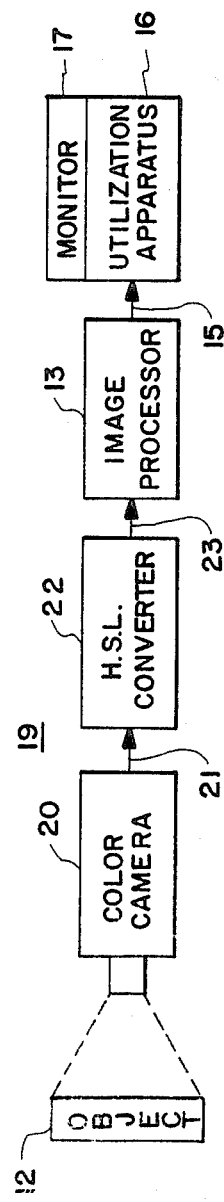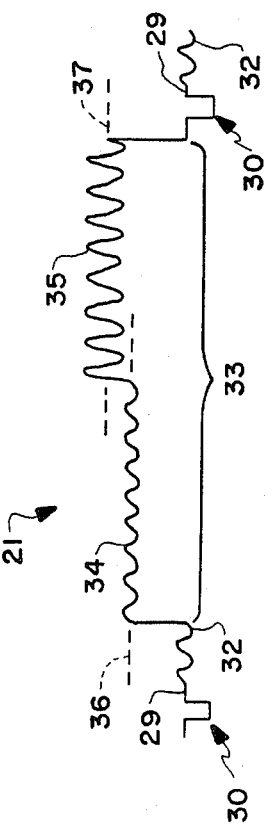

CHROMA RESPONSIVE INSPECTION APPARATUS SELECTIVELY PRODUCING ANALOG VOLTAGE LEVELS BASED ON THE LUMINANCE, THE PHASE OF THE CHROMINANCE SUBCARRIER, OR THE AMPLITUDE OF THE CHROMINANCE SUBCARRIERCROSS REFERENCE

Cross reference is here made to U.S. Pat. No. 4,590,111 issued on May 20, 1986.

BACKGROUND OF THE INVENTION

The present invention relates to the field of quality control. More particularly, it relates to the inspection of industrial "scene", such as manufactured objects, for example, to determine automatically the presence or absence of proper parts, their identification, and their position or orientation, where color is a factor in the inspection process.

In any light image, there are three major components forming the composite light image. These components are luminance or intensity, hue, and saturation. In prior art electronic imaging inspection apparatus, monochrome video cameras have been used which respond only to the intensity or luminance component of the composite image. The monochrome video camera produces a signal, as noted, representing the intensity pattern of the object viewed. That signal is presented to an image processor which assigns a binary or "gray-scale" digital value to each pixel of the image in accordance with the luminance or intensity of the light signal at that pixel. The digital representation may then be compared with a prerecorded standard signal to provide an acceptance or rejection control of the examined object. On the other hand, in more sophisticated systems, the signal may be used by a programmed computer to compute the area, perimeter, coordinates, orientation, etc. of the parts. Additionally, the output signal may be applied to a video monitor for observation by a human observer.

The parts of a complex object are distinguished by the contrasts between them and surrounding elements or background. A difficulty arises when the parts differ from a background or from one another, only by color or color coded markings.

It will be remembered that the complete light image of an object has three characteristics, namely hue, saturation, and luminance. The hue and saturation components together are referred as the chroma or chrominance of the image. As noted, the output of the monochrome video camera contains only the luminance component. Accordingly, adjacent elements in an object which are of different colors and yet have the same luminance or brightness, may be indistinguishable, having the same shade of gray, in a monochrome presentation. Exemplary of such objects which would be indistinguishable on the basis of luminance alone, are found in the inspection of electronic component boards wherein resistors of various values differ from one another only in the color coding carried thereby. Similarly, resistors and capacitors may be distinguished from each other only in the color representation. Numerous other exmples may be found.

Heretofore, efforts have been made to overcome the aforementioned shortcoming of monochrome inspection techniques by using a color video camera, then processing the individual red, cyan, and blue signals provided thereby with three separate image processing devices to assign digital values for each of the color components. Thereafter, the results are combined and compared to determine the color as well as the other features of the part being observed. Such systems are quite costly in that they involve three separate image processing paths, and they take considerably more time in operation than is desirable.

In the above referenced U.S. Pat. No. 4,590,511 issued May 20, 1986, there is shown an inspection system which derives from the single, composite output signal of a color video camera, a signal which is interpretible by gray-scale image processing equipment. The system of the co-pending patent application not only distinguishes the presence and location of the parts of an object represented by their luminance, but also is capable of distinguishing the hue component of the image. In some instances, however, hue or luminance are not sufficient to distinguish objects; a measure of the saturation component is also needed.

SUMMARY OF THE INVENTION

It is, accordingly, an object of the present invention to provide an improved inspection apparatus which avoids the shortcomings of the aforementioned systems.

Another object of the present invention is to provide an improved inspection apparatus as set forth which provides a broader range of recognition of the characteristics of the object being inspected.

In accomplishing these and other objects, there has been provided, in accordance with the present invention, an inspection apparatus which is arranged to respond, selectively, at the option of the operator, to either the hue component of the composite color signal, the saturation component of the composite video signal or the intensity or luminance component of the composite signal, to produce a corresponding output signal to which the signal image processor may respond to produce suitable gray-scale images for the operation of the inspection system.

BRIEF DESCRIPTION OF THE DRAWINGS

A better understanding of the present invention may be had from the following detailed description when read in the light of the accompanying drawings in which:

FIG. 1 is a block diagram illustrating the prior art monochrome system;

FIG. 2 is block diagram illustrative of an inspection system embodying the present invention;

FIG. 3 is a wave form diagram representative of a composite video signal from a color video camera;

DETAILED DESCRIPTION

Figure 4:
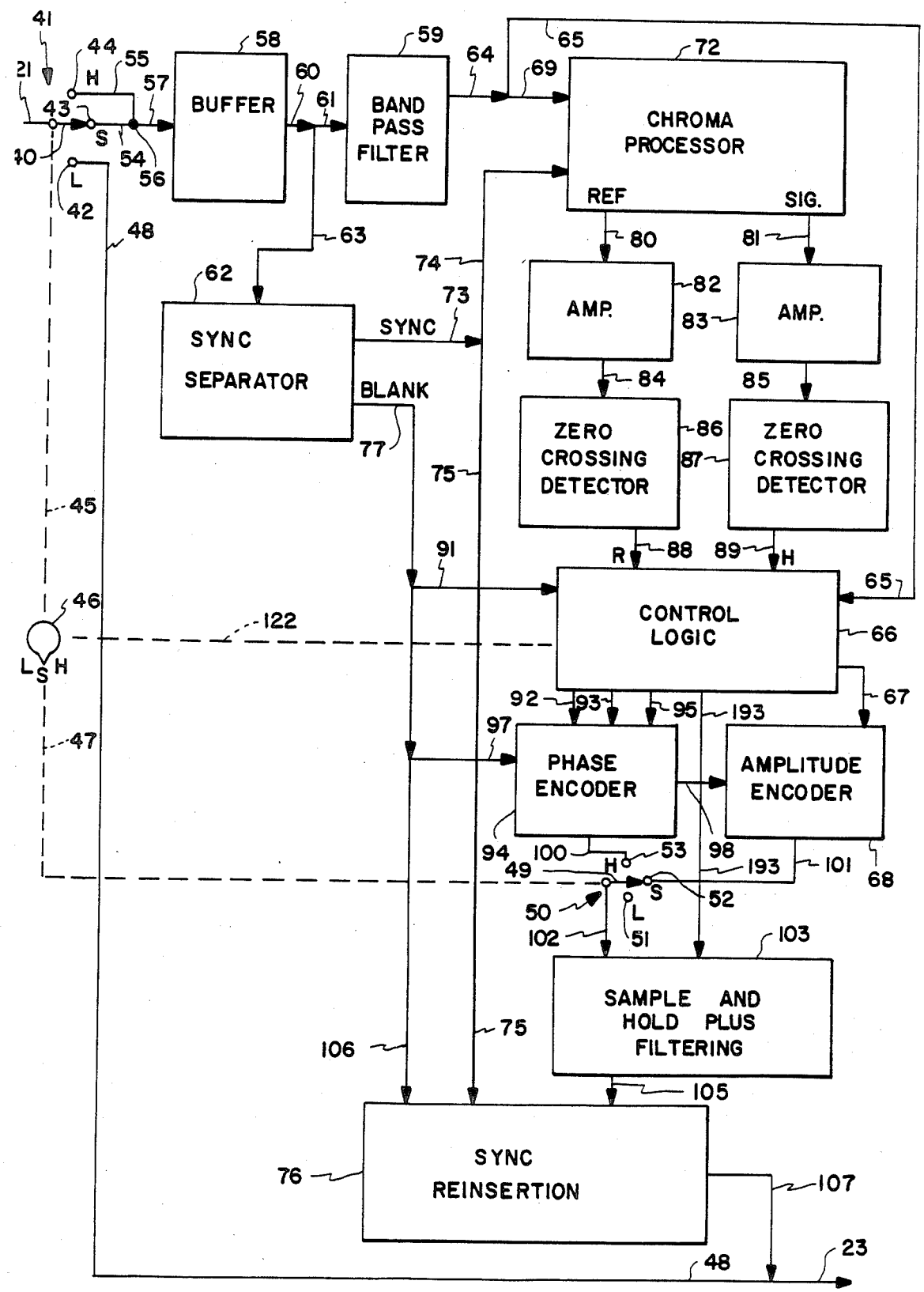
FIG. 4 is a block diagram illustrating greater details of the HSL converter of FIG. 2.

Referring now to the drawings in more detail, there is shown in FIG. 1 an inspection system 10 which includes a monochrome video camera 11 viewing a scene or object 12. The object 12 may represent colored components, for example, of an electronic circuit board. The output signals from the camera 11 are supplied to an image processor 13 in the form of a so-called black and white signal 14. The signal 14 represents the luminances or intensities of the various parts of the object. The processor 13 performs gray-scale digitizing of the image signal and supplies its output 15 to a utilization apparatus 16.

The utilization apparatus 16 may include a video monitor 17 to be observed by an operator. The utilization apparatus may also include means for comparing the output signal from the processor 13 to a prerecorded standard signal, the comparison producing a signal which may, in turn, be used in appropriate process control equipment for sounding alarms, effecting selection or rejection of the examined component or to effect automatic adjustment of the components which had produced signals indicative of an error. Image processors, such as the image processor 13, are generally adapted to receive a particular type of gray-scale signals, such as that identified by the EIA Standard RS 170. The camera output 14 therefore customarily takes the form of the signal specified by the aforementioned Standard.

In FIG. 2, there is shown in block diagram form, a more advanced inspection system 19 in accordance with the present invention. Again, the signals are processed by an image processor 13, the output 15 of which is applied to a utilization apparatus 16 which may, in turn, include a video monitor 17 all in accordance with the corresponding portions of the system shown in FIG. 1. In this case, however, the object 12 is viewed by a color video camera 20, the output 21 of which is applied as an input signal to an HSL converter 22. The output of the converter 22 is applied on a lead 23 to the input of the image processor 13. Since the output of the color video camera 20 is in the form corresponding to the "N.T.S.C." standard, it is not usable directly by the processor 13. The converter 22 is therefore interposed between the camera 20 and the image processor 13 to provide an output signal representative of the components of the color video signal but in a form usable by the processor 13.

In order to better understand the present invention, attention is now directed to FIG. 3. This figure illustrates a portion of the signal 21 output from the color video camera 20 and responds to a single horizontal sweep across the image of the object 12. For simplicity, it is assumed to have only two different colors, each of a uniform hue, luminance and saturation.

The signal in FIG. 3 is initiated with a horizontal sync pulse 30 which is of standard configuration. Another such sync pulse 30 is shown at the end of the color scan and signifies the beginning of the next horizontal scan. Each of the sync signals has on its "back porch" a color burst 32 of a fixed subcarrier frequency which is sinusoidal about a DC level 29. The picture signal 33 represents the object in its exemplary two colors, which appear as portions 34 and 35, respectively. The components are of the same frequency as the subcarrier color burst 32, but are phase displaced with respect thereto by amounts determined by the hues of the two colors. For example, a phase displacement of 0° may represent the hue red, while a phase displacement of 180° might represent the complementary hue cyan. These color components are sinusoidal about levels 36 and 37, respectively, which are representative of the luminances of the colors. The amplitudes of the signals 34 and 35 about the levels 36 and 37, respectively, are representative of the relative saturations of the colors.

The improved color or hue-saturation-luminance (HSL) converter, 22 is shown in block diagram in FIG. 4. It functions to derive from the composite signal 21 of FIG. 2 (and illustrated in FIG. 3), an output signal at the output 23 which may, selectively, be representative of any one of the three elements; hue, saturation or luminance (intensity) of the composite signal.

The first or hue output is an analog voltage having successive portions representative only of the phase relations between portions 34, 35, etc. of the composite signal, respectively, and the phase standard established by the color burst signal 32. The thus produced hue signal is uninfluenced by the levels 36, 37, etc. or by the amplitudes of the signal portions 34, 35, etc. about these levels.

The second, or saturation output, is an analog voltage having successive portions representing only the amplitudes of the signal portions 34, 35, etc. about the levels 36, 37, etc., respectively. Again, the saturation signal is uninfluenced by the levels themselves or by the phase relationship of the components.

Third, the luminance or intensity output is an analog voltage having successive portions representative only of the levels, 36, 37, etc., the analog voltage is, in each case, supplied in an appropriate form for digitizing in the processor 13. In FIG. 4, there is illustrated means for accomplishing the formation of the foregoing signal.

In the converter 22, the composite signal input line 21 is connected to the armature 40 of a three position input switch 41 having fixed contacts 42, 43, and 44. It may be actuated, through a mechanical connection 45, by a manual knob 46. Relay, or electronic switching, may, of course be substituted. The knob 46 further acts through a second mechanical connection 47 to actuate the armature 49 of a three position output switch 50 having fixed contacts 51, 52, and 53. This output switch will be referred to in more detail hereinbelow. The switch contact 51 is open.

The contact 42 of the input switch 41 is directly connected to the output lead 23 by a conductor 48. The contacts 43 and 44 are connected, respectively, by the conductors 54, 55 to a junction point 56, which is, in turn, connected by conductor 57 to an input buffer 58. The output of the buffer 58 is connected to the input of a band-pass filter 59 by a serial connection of the conductors 60 and 61. A sync separator 62 is also connected by the conductors 60 and 63 to the output of the buffer 58. The input buffer 58 removes any DC offset. It may also provide some gain for the incoming color video signal, for example, by a factor of six.

The filter 59 passes a frequency range including the frequencies of the color burst signal 52 and the signal portions 34, 35, but does not pass at the repetition frequency of the sync pulses 30 nor that of the luminance (intensity) levels 36 and 37. It typically has a center frequency of 3.58 MHz and a band width of about 2 MHz. The filter output is fed on the conductors 64 and 65, through a control logic unit 66 and a conductor 67, to an amplitude encoder 68. It is also applied by the conductors 64 and 69 to the input of a chroma processor 72.

The sync separator 62 extracts from the composite signal the horizontal sync pulses 30, supplying them on the conductors 73 and 74 to the chroma processor 72. The separated sync signals are also supplied on the conductors 73 and 75 to a sync reinsertion module 76 discussed hereinbelow. The sync separator also supplies blanking pulses on a conductor 77 for suppressing the signal processing during scanner retrace.

The chroma processor 72 is a commercially available item, identified by the RCA Number CA3126Q. It contains a local generator which is phase-locked to the color burst signal 32, to supply a first, or reference, or regenerated subcarrier output at the output lead 80. It also supplies a second or "chroma" output signal at the output lead 81 containing the high frequency components of the signal pulses 34 and 35, retaining their phase relation with the reference or regenerated subcarrier 80.

The outputs 80 and 81 are fed, respectively, through the amplifiers 82 and 83. The output of the amplifier 82 is supplied, by way of a connection 84, to a zero crossing detector 86. Similarly, the output of the amplifier 83 is applied, by way of a connection 85, to a zero crossing detector 87. The zero crossing detector 86 provides an output, at the connection 88, representing the reference or regenerated subcarrier signal 80. It is applied as one input to a control logic unit 66. The zero crossing detector 87 provides an output, at the connection 89, representing the hue component of the composite signal. This signal is also applied as an input signal to the control logic unit 66. The blanking signal on the lead 77 is also applied by way of the lead 91 to a further input to the control logic unit 66. The control logic unit 66 has a first output on the connection 92, representing the hue component of the chorma signal, which is applied as one input to a phase encoder 94. A second output from the control logic unit 66 on the connection 93 is applied as a second input to the phase encoder 94. Additionally, the control logic unit 66 supplies timing signals on a connection 95 to the phase encoder 94, and on the connection 96 to the sample-and-hold unit 103. As will be seen hereinafter, a reset signal generated in the control logic unit 66 is applied, through the phase encoder 94 to the amplitude encoder 68 by way of a connection 98.

The phase encoder 94 supplies a hue signal, at an output 100, to the switch contact 53. The amplitude encoder 68 supplies a saturation signal, at an output 101, to the switch contact 52. One of these signals is selected by operation of the switch armature 49 and applied on the conductor 102 to a sample-and-hold module 103. The sample-and-hold unit 103 has an output 105 connected to the sync restoration module 76. The module 76 is supplied with sync and blanking signals from the sync separator 62 by way of leads 75 and 106, respectively. The output 107 of the module 76 is connected to the output conductor 23. The output signal on the lead 107 is a gray-scale analog of the hue or the saturation components of the composite signal at the input 21.

Figure 5:
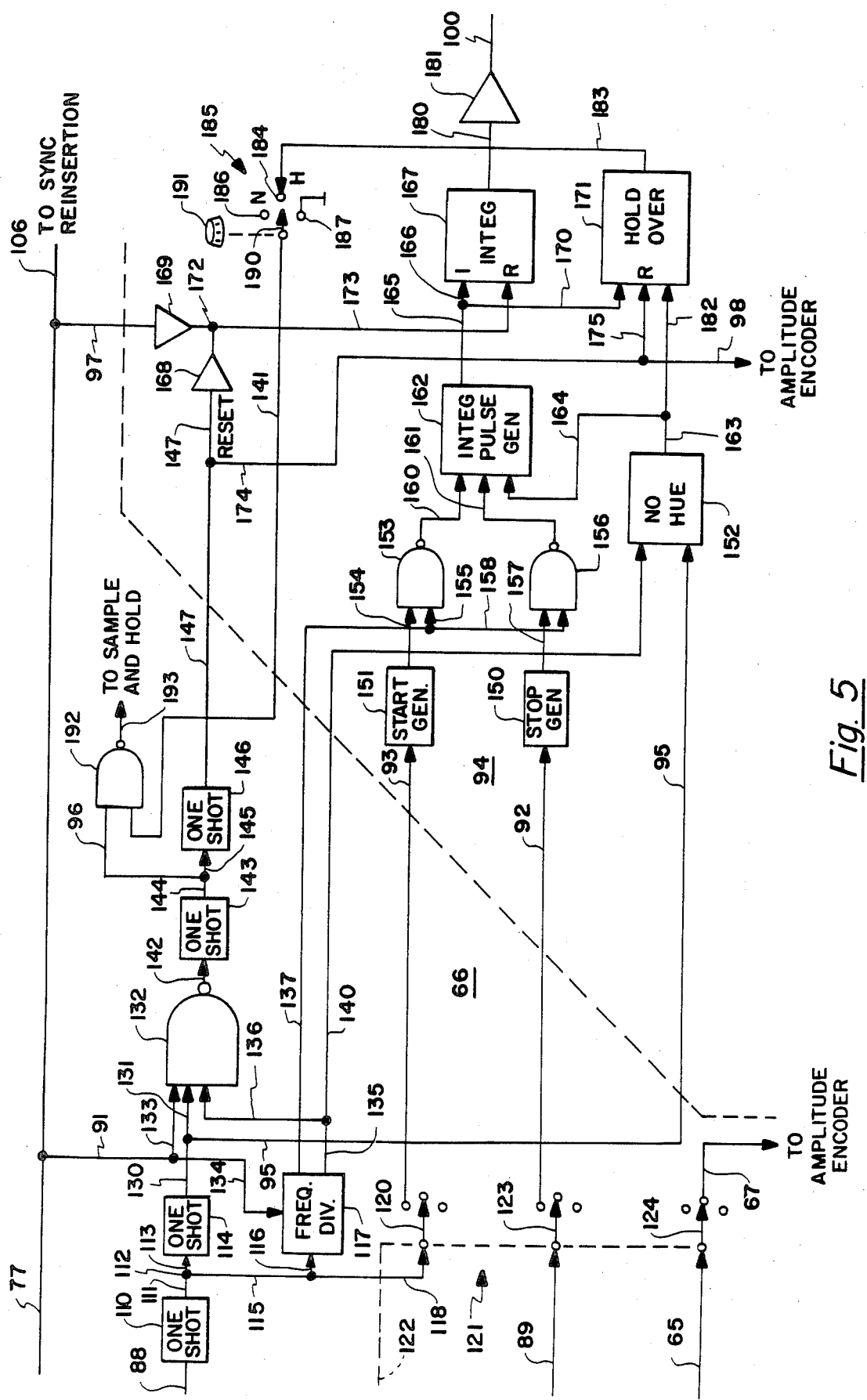
FIG. 5 is a schematic diagram illustrating further details of certain elements of the HSL converter shown in FIG. 4.

Attention is now directed to FIG. 5 which gives more detail of one embodiment of the control logic 66 and the phase encoder 94. The conductor 88 is connected to the input of a one-shot 110 the output of which is connected by a conductor 111 to a junction point 112. The junction point 112 is also connected by a conductor 113 to a second one-shot 114, by conductors 115 and 116 to a frequency divider 117, and by conductors 115 and 118 to a first armature 120 of a switch 121. The switch 121 is ganged with the input and output switches by a coupling 122 which may be in the form of a mechanical connection. The switch 121 includes two further armatures 123 and 124, connected, respectively, to receive signals 89 and 65. It will be appreciated that relay switching or electronic switching can be used as an alternative to the mechanical switches illustrated.

The one-shot 114 is connected by the conductors 130 and 131 to a logical NAND circuit 132. The one-shot 114 is further connected by the conductors 130 and 95 to the phase encoder 94. The blanking signal input conductor 91 is connected by a conductor 133 to the NAND circuit 132. The output of the frequency divider 117 is connected by the conductors 135 and 136 to the NAND circuit 132. The output of the frequency divider 117 is also connected by a conductor 137 and the conductors 135 and 140 to the phase encoder 94.

The output of the NAND circuit 132 is applied on a lead 142 to a one-shot 143, the output of which is applied on the conductors 144 and 96 to NAND circuit 192. A further input to the NAND circuit 192 from encoder 94 is supplied on a conductor 140. The output of the NAND circuit 192 is applied on conductor 193 to the sample-and-hold module 103. The output of the one-shot 143 is also applied, on the conductors 144 and 145, to a second one-shot 146, the output of which is applied on a reset conductor 147, to the phase encoder 94.

The phase encoder 94 includes, in the exemplary embodiment, a plurality of separate signal generators 150, 151 and 152. The signal generator 150 is connected to receive the reference signal on the lead 92. The signal generator 151 is connected to receive the hue signal on the lead 93. The signal generator 152 is connected to receive the timing signals on the lead 95. A NAND circuit 153 has one input connected to the output of the generator 151 by a conductor 154. A second input of the NAND circuit 153 is connected to the frequency divider output conductor 137 by a conductor 155. Another NAND circuit 156 has one input connected to the output of the generator 150 by a conductor 157. A second input on the NAND circuit 156 is connected to the frequency divider output conductor 137 by a conductor 158. The generator 152 has a further input connected to the frequency divider output conductor 140.

The output of the NAND circuit 153 is connected by a conductor 160 to a first input of a pulse generator 162. The output of the NAND circuit 156 is connected by a conductor 161 to a second input of the pulse generator 162. The output of the signal generator 152 is connected by the conductor 163 and 164 to a third input of the pulse generator 162. The output of the pulse generator 162 is applied, on the conductors 165 and 166, to a first input of an integrator 167. The output of the pulse generator 162 is also applied, on the conductors 165 and 170 to a hold over module 171. The reset signal conductor 147 and the blanking signal conductor 97 are connected, through isolating amplifiers 168 and 169, respectively, at a junction point 172. The junction point 172 is, in turn, connected by a conductor 173 to a second input of the integrator 167. The reset signal conductor 147 is connected by the conductors 174 and 175 to the hold over module 171. The reset signal is also applied to the amplitude encoder 67 by the conductor 98, as hereinbefore noted.

The output lead 180 of the integrator 167 is connected to the conductor 100 through an amplifier 181. The hold-over module 171 is connected to receive a further input signal from the output of the pulse generator 152 on the conductors 163 and 182. The output of the hold over module 171 is connected by a conductor 183 to one fixed contact 184 of a switch 185. The switch 185 has further fixed contacts 186 and 187, and an armature 190 actuated, illustratively, by a knob 191. The switch contact 187 is grounded, the switch contact 186 is open, and the armature 190 is connected by the conductor 141 to one input of the NAND circuit 192 in the control logic 66.

OPERATION

For a standard black and white video signal, the instantaneous DC level of the signal represents the luminance of the corresponding point of the image. It is this DC level that a machine vision system or image processor digitizes into a gray-scale value. On the other hand, a composite color video signal not only contains a DC level which represents the luminance, but it contains AC information which represents the color content (hue and saturation) of the image. The phase of this AC information represents the hue and the amplitude represents saturation. To make this phase and amplitude information usable by a vision system which only processes DC information, it must be encoded into a signal in which the DC level represents phase or amplitude (hue or saturation). This is what the color encoder does. The color encoder of the present invention operates in real time at video frame rates.

The operation of the herein described system is as follows. The color video camera 20 is directed at an object 12 and its video output represents a succession of horizontal sweeps across the object at successive vertical levels, each sweep comprising a wave form suggested by FIG. 3. The user sets the knob 46 at a selected one of its three positions.

The luminance position is used in inspection cases where object-to-object or object-to-background luminance contrast is adequate for object discrimination, or where color is not necessary to identify or discriminate between objects. In this position of the knob 46, the armature 40 of the input switch 41 engages the contact 42, the switch armatures 120, 123 and 124 and 49 engage open contacts. This disables the phase and amplitude encoding (hue and saturation) operation. The input video signal 21, including the chrominance content and the sync and blanking information from the camera 20, is thus conducted directly to the output 23 without modification. The monochrome image processor or vision system ignores the chrominance content of this signal and processes only the DC level (luminance) of this signal. The signal is thus treated as a typical monochrome luminance signal. In this setting of the knob 46 the system operates in a substantially conventional manner.

In the saturation position of the knob 46, the armature 40 of the input switch 41 engages the contact 43; the armature 124 connects the conductor 65 to the conductor 67 which is, in turn, connected to the input of the amplitude encoder 68. The output switch armature 49 connects the conductor 101 to the conductor 102, thus supplying the output of the amplitude encoder 68 to the sample-and-hold module 103. The band pass filter 59 strips the composite signal of the sync signals as well as the DC levels 29, 36 and 37. Thus, the output of the filter 59 is a signal consisting only of the sinusoidal portions 32, 34 and 35 of the wave form in FIG. 3. These sinusoidal portions represent the color burst reference signal, the hue signal and the saturation signal without reference to the luminance content. This signal is then fed by way of the conductors 64 and 65, the switch armature 124 and the conductor 67 to the amplitude encoder 68. As hereinbefore noted, the color burst subcarrier signal as well as the chrominance signal has a frequency of about 3.58 MHz. The amplitude encoding process takes two cycles of that subcarrier frequency. Thus, new values of amplitude (saturation) are available at a rate of 1.79 MHz. The amplitude encoder consists of a high speed peak detector which tracks the output of the signal on the conductor 67 for approximately 1.5 cycles of the subcarrier signal. Its output on lead 101 holds the peak value it detects during this time. During the remaining 0.5 cycles of one amplitude encode process, the peak detector is reset to zero so new tracking can begin for the next two cycles of the signal. The peak detector output is sampled by the sample-and-hold module 103 just prior to reset. Both sampling and reset occur under the control of the control logic block 66. The output of the sample-and-hold module 103 is thus a signal in which th DC level is proportional to the peak-to-peak amplitude of the original color input signal.

The color input signal is also fed from the buffer 58 to the sync separator 62. The sync separator 62 extracts the horizontal and vertical sync pulses from the video signal by way of thresholding, and also generates blanking pulses by thresholding the video signal at the blanking level (as defined for color composite video signals). The blanking signal is also supplied to the control logic block 66 on the conductor 91 where it is used to disable encoding during blanking intervals. The blanking and sync signals are also supplied to the sync reinsertion block 76 on the conductors 106 and 75, where they are inserted into the amplitude encoded (saturation) signal coming from the sample-and-hold module 103, to create a video signal of standard format for signals received by monochrome monitors, vision systems and image processors. The output signal of the sync reinsertion block is connected to the output terminal by way of the conductor 107. This output is now an amplitude-encoded monochrome video signal in which the DC level (gray-scale) now represents the saturation level of the color input signal.

In the hue position of the knob 46, the armature 40 of the input switch 41 engages the contact 44; the armature 120 connects the conductor 118 to the conductor 93; the armature 123 connects the conductor 89 to the conductor 92; and the armature 124 engages an open contact. With the armature 124 engaging an open contact, the amplitude encoder is disabled. The output switch armature 49 connects the conductor 100 to the conductor 102 thus supplying the output of the phase encoder 94 to the sample-and-hold module 103.

The composite color input signal 21 is again fed through the buffer 58 and the band pass filter 59 where the sync signals and the luminance or DC information is removed from the signal, leaving only the chrominance information. The output of the band pass filter 59 passes, on the conductors 64 and 69, to the chroma processors 72. In the chroma processor, a local 3.58 MHz oscillator is phase locked to the subcarrier burst signal 32 of FIG. 3, and is output on the conductor 80 to the amplifier 82. The chrominance signal (components 34 and 35, etc. of FIG. 3 stripped of the DC levels 36 and 37, etc.) is output from the chroma processor on the conductor 81 to the amplifier 83. As before noted, the output of the amplifier 82 is connected to the input of a zero crossing detector 86 and the output of the amplifier 83 is connected to the input of a zero crossing detector 87. Each zero crossing detector has a TTL output, which is set high when its input is non-negative, and is set low when its input is negative. In this way, the sinusoidal oscillator reference and chrominance signal are converted to square wave pulses, with the same phase relationship maintained between the two signals.

The leading edge of the oscillator reference pulse triggers the one-shot 110, which inserts a desired delay.

The delayed reference pulse from the one-shot 110 is fed on the conductors 111, 115 and 116 as the control for the divide-by-two frequency divider 117. A single phase encoding process takes two cycles of the 3.58 MHz subcarrier frequency. To enable this, the frequency divider generates control signals which are used to eliminate every other start/stop integration, sampling, and reset pulses.

The delayed reference pulse from the one-shot 110 is also fed on the conductors 111, 115, 118, the switch 120 and the conductor 93 to the generator 151. The leading edge of the reference pulse triggers generation of a pulse used to start an integrator. The start pulse from the generator 151 passes, on the conductor 154, to the NAND 153, which is used to eliminate every other start pulse under control of the frequency divider 117. The hue pulse on the conductor 89 is fed to the generator 150 via the switch 123 and the conductor 92. The leading edge of the hue pulse triggers generation of a pulse used to stop the integrator. This stop pulse passes, on the conductor 157, to the NAND 156, where every other pulse is again eliminated. These start and stop pulses are fed to the generator 162 on the conductors 160 and 161, respectively. The generator 162 creates a pulse whose width is equal to the time difference between the leading edges of the start pulse (reference) and the stop pulse (hue). This new pulse, the integration pulse, controls the operation of the integrator 167. The integrator 167 integrates for a timed duration equal to the pulse width. The integrator 167 linearly ramps up from zero, reaching a final value which is proportional to the time of the integration, and thus is also proportional to the phase difference between the reference portion 32 and the hue portions 34 and 35 of the color video signal in FIG. 3. As mentioned before this phase difference is representative of the hue of the image.

The delayed reference pulse from the one-shot 110 is also passed to the one-shot 114 on the conductors 111 and 113. The one-shot 114 also generates a further delay so the sampling of the integrator output occurs at the appropriate time in the two cycle interval. The delayed pulse from the one-shot 114 passes on the conductos 130 and 131, to the NAND 132. The NAND 132 controls a divide-by-two function for the generation of sampling and reset pulses, and disables sampling during blanking intervals. The delayed pulse out of the NAND 132 is used to trigger generation of a sampling pulse by a one-shot 143. This sampling pulse is then used to trigger generation of a reset pulse by the one-shot 146 so the reset of the integrator immediately follows sampling.

Once the integrator has stopped ramping, it holds the final value attained. The integrator output is fed on the conductor 180 through the buffer 181, then on the conductor 100, the switch 50, and the conductor 102, to the input of the sample-and-hold module 103. The sample-and-hold module is triggered to take a sample of the integrator output by the pulse from the one-shot 143 as it is passed through NAND circuit 192.

For the hue signal, separation of the sync information from the composite color input signal and the reinsertion of the sync information into the hue encoded monochrome output signal are handled in the same way as for saturation. The output of the encoder in the case of hue is a phase encoded monochrome video signal in the standard format in which th DC level (gray-scale) now represents the hue of the color input signal.

A feature present in this structure is embodied in the generator 152 in the hold-over module 171, which is useful for determining hue in cases where the color information is noisy, or for smoothing out hue-encoded images in cases where the chroma signal amplitude varies between high and very low levels. The conductor 95 is connected to one input of the generator 152 while the output of the frequency divider 117 is connected by way of the conductors 135 and 140 to a second input of the generator 152. The generator 152 produces a timed pulse in accordance with the every other cycle operation characteristics of the other elements of the system. The output of the generator 152 is connected by the leads 163 and 164 to a further input of the integrating pulse generator 162. This signal constitutes an input signal to the generator 162 during appropriate intervals of the cycle. The output from the module 152 is also applied, by way of the leads 163 and 182, to an input of the hold-over module 171. In the absence of a hue signal represented by the output of the generator 162 applied to the input of the hold-over module 171, the hold-over module 171 provides an output signal on the lead 183. That signal is applied to the fixed contact 184 of the switch 185 and, when the knob 191 is set to connect the armature 190 to the fixed contact 184, the signal on the lead 183 is applied by way of the lead 141 to the input of the NAND 192. The application of that signal to the NAND 192 inhibits the generation of the sample signal on the lead 193. This allows the sample-and-hold module to hold as an output the last non zero hue value.

The normal operation of the system is accomplished with the switch 185 having the armature 190 connected to the open contact 186. In the third position of the switch 185 with the armature 190 in contact with the grounded terminal 187, the sample and reset signals generated by the one-shots 143 and 146 are inhibited for both hue and saturation operations, thereby facilitating initial calibration of the system.

Thus there has been provided, in accordance with the present invention, an improved inspection apparatus for industrial quality control environments, using video technology, which provides a full range of image signal discriminaton and a selection between luminance, hue and saturation components of a video signal.

The embodiments of the invention in which an exclusive property or privilege is claimed are defined as follows.

1. In a video inspection apparatus in which a color video camera is used with a monochromatic image processor, and in which said color video camera produces a composite video signal having components representing, respectively, the luminance, hue and saturation elements of a viewed scene,
a color converter including:
means for distinguishing and separating said components of said composite signals;
means for producing an analog voltage level signal corresponding, respectively, to each of said hue and saturation components; and
means for applying, selectively, one of said analog voltage level signals or said luminance component signal to said monochromatic image processor.

2. A color converter as set forth in claim 1 wherein said means for applying one of said analog voltage level signals to said image processor includes a sample-and-hold circuit means coupled, selectively to the outputs, respectively, of said means for producing said analog voltage level signals.

3. A color converter as set forth in claim 2 wherein said means for distinguishing and separating said components includes a band-pass filter.

4. A color converter as set forth in claim 1 wherein said means for producing an analog voltage level signal corresponding to said hue component includes phase discriminating means.

5. A color converter as set forth in claim 2 wherein said means for producing an analog voltage level signal corresponding to said hue component further includes integrating means controlled by the output of said phase discriminating means to produce said analog voltage level signal representative of said hue element.

6. A color converter as set forth in claim 1 wherein said means for producing an analog voltage level signal corresponding to said saturation component includes a peak detector for producing said analog voltage level signal corresponding to the amplitude of said signal component representative of said saturation element.

7. In a video inspection apparatus in which a color video camera is used with a monochromatic image processor, and in which said color video camera produces a composite video signal having components representing, respectively, the luminance, hue and saturation elements of a viewed scene, a color converter connected between said camera and said processor, said color converter including:

means including a band-pass filter for distinguishing and separating said components of said composite signals;

first means connected for producing an analog voltage level signal corresponding to said hue component, said first means including phase discriminating means and integrating means controlled by said phase discriminating means to produce said analog voltage level corresponding to said hue component;

second means for producing an analog voltage level signal corresponding to said saturation component of said composite signal, said second means including an amplitude responsive peak detector for producin said analog voltage level signal representative of said saturation element;

means including a sample-and-hold circuit means coupled, selectively, to the output of said first and second means for applying said analog voltage level signals, respectively, to said monochromatic image processor; and means for selectively coupling said luminance component signal directly to said image processor.

8. A color converter as set forth in claim 7 and further including hold-over circuit means coupled to said signal from said first means to produce, in response to a temporary lack of the hue component signal, control signal means for selectively holding at the output of said sample-and-hold circuit means the signal corresponding to the last received hue component signal.

* * * * *